Patented Dec. 4, 1951

2,577,414

UNITED STATES PATENT OFFICE 2,577,414

TRANSPARENT CASTING FROM STYRENE-POLYESTER COPOLYMER

George L. Fraser, Springfield, and Harold F. Park, East Longmeadow, Mass., assignors to Monsanto Chemical Company, St. Louis, Mo., a corporation of Delaware No Drawing. Application December 29, 1948, Serial No. 68,065

1 Claim. (Cl. 260—45.4)

This invention relates to copolymers of styrene and polyesters of glycols and alpha,beta-unsaturated aliphatic acids.

It has been suggested that cast resin articles be made by polymerizing mixtures of styrene and polyesters of glycols and alpha,beta-unsaturated dicarboxylic acids in the presence of organic peroxides. Castings prepared from such mixtures are found to be useful for many purposes but have been subject to the disadvantage of being somewhat hazy, particularly in thick sections.

It is an object of this invention to provide improved cast polymers made from mixtures of styrene and polyesters of glycols and alpha,beta-unsaturated dicarboxylic acids. A particular object of the invention is to prepare heat hardened castings with improved transparency made from mixtures of styrene and polyesters of glycols and alpha,beta-unsaturated dicarboxylic acids.

These and other objects are attained according to this invention by incorporating 0.01–1% of an alkali metal sulfonate containing 12 to 20 carbon atoms in a fluid mixture of styrene, a polyester of a glycol having 2–8 carbon atoms and an alpha,beta-unsaturated dicarboxylic aliphatic acid and then polymerizing the mixture.

The following examples are illustrative of the present invention, but are not to be construed as limitative thereof. Where parts are mentioned, they are parts by weight.

EXAMPLE I

|  | Parts |
| --- | --- |
| Polyester "A" | 100 |
| Styrene | 40 |
| Benzoyl peroxide | 1 |
| Sodium sulfonate of dioctyl succinate | 0.05 |

The above ingredients are admixed and the mixture placed in a suitable mold having circular cavity about 1 inch in diameter. The mold and its contents are heated at 50° C. for 24 hours, followed by a gradual rise in temperature at 100° C. over a period of 1 hour and finally heated at 100° C. for 2 hours. The resulting heat hardened casting is removed from the mold and is found to be transparent and free from haze.

In contrast to the haze-free casting obtained as described above, polymerization in the same manner of a mixture which is identical to that given above except that no sodium sulfonate of dioctyl succinate is included, results in a casting that is so hazy that it is difficult to distinguish objects through the casting.

Castings similar to those obtained in Example I are obtained by substituting for the sodium sulfonate of dioctyl succinate an equal amount of the sodium sulfonate of dodecyl benzene and the sodium sulfonate of di-isobutyl naphthalene respectively.

EXAMPLE II

Example I is repeated except that 3 parts of tertiary butyl hydroperoxide are used in place of the benzoyl peroxide. The heat hardened castings are free from haze, whereas, castings which do not contain the sulfonate are characterized by a considerable amount of haze.

EXAMPLE III

|  | Parts |
| --- | --- |
| Polyester "B" | 100 |
| Styrene | 40 |
| Tertiary butyl hydroperoxide | 3 |
| Sodium sulfonate of dioctyl succinate | 0.05 |

Castings in the shape of rods having a diameter of about 1 inch are obtained by heating a mixture of the above ingredients in a suitable mold for 24 hours at 50° C., followed by 24 hours at 80° C. The heat hardened castings are free from haze, whereas, otherwise identical castings which do not contain the sulfonate have a distinct bluish haze throughout.

EXAMPLE IV

Example III is repeated except that the amount of the sodium sulfonate of dioctyl succinate is reduced to 0.01 part. The castings which are obtained by heating the mixture as in Example III are found to be substantially improved in clarity over otherwise identical castings which do not contain the sulfonate.

Numerous variations may be introduced into the invention as illustrated by Examples I–IV. Thus, as is known to those skilled in the art, such polymerizable materials may be heat hardened at various temperatures and for various lengths of time. Usually temperatures within the range 40–100° C. are found to be most feasible and the heating is continued until substantially maximum hardness is obtained.

The invention is applicable to mixtures of styrene and polyesters which are polymerized in the presence of organic peroxides generally. Thus, in place of benzoyl peroxide and tertiary butyl hydroperoxide, such other peroxides may be present as acetyl peroxide, ditertiary butyl peroxide, etc. Usually such peroxides are used in the proportions 0.05–5%, based on the weight of the polymerizable materials.

The relative proportions of styrene and polyester may be substantially varied depending on the type of polymer which is desired. For most purposes, it is found that 20–60 parts of styrene for every 100 parts of polyester represents a desirable range.

Various alkali metal sulfonates of organic compounds containing 12–20 atoms may be used in accordance with the invention. Examples of such sulfonates include the sodium sulfonate of dioctyl succinate, the sodium sulfonate of dodecyl benzene, the sodium sulfonate of decyl benzene, dibutylated-o-hydroxy biphenyl sodium disulfonate, butylated-o-hydroxy biphenyl sodium sulfonate, di-isobutyl naphthalene sodium sulfonate, isopropyl naphthalene sodium sulfonate, aralkyl polyester sodium sulfonate, etc. In preparing castings with improved transparency, it is desirable to use at least 0.01% of a sulfonate of a type illustrated above, but usually not more than 1% is desirable.

In place of the sodium sulfonate, other alkali sulfonates may be used, for example, ammonium, potassium, cesium, lithium and rubidium sulfonates. Mixtures also may be used.

The polyesters are prepared in accordance with the well known methods for preparing such materials. Usually, this is done by heating a mixture of a glycol and an alpha,beta-unsaturated dicarboxylic aliphatic acid at a temperature of about 200° C. In order to facilitate the course of the reaction and to remove water of reaction as it is formed, the expedient is adopted of bubbling an inert gas through the mixture, as for example, carbon dioxide, nitrogen, etc. It may also be desirable to subject the reaction mixture to a partially reduced pressure during the final stages of the condensation, for example, by employing an absolute pressure corresponding to 8-10 millimeters of mercury. Reaction under these conditions is usually continued until the reaction mixture has an acid number of not over 100, preferably, between 25 and 75. Thus, a polyester is employed with a relatively low acid number and substantially free from water.

The polyesters used in the examples are prepared as follows:

Polyester A

| | Parts |
|---|---|
| Ethylene glycol | 68 |
| Maleic anhydride | 98 |

The above mixture is heated at a temperature of about 200° C. while bubbling carbon dioxide through the reactants until the acid number of the reaction mixture is reduced to about 50.

Polyester B

| | Parts |
|---|---|
| Maleic anhydride | 343 |
| Phthalic anhydride | 148 |
| Diethylene glycol | 106 |
| Ethylene glycol | 216 |

The above ingredients are placed in a suitable vessel and heated with stirring at 145° C. for 1 hour. Then the temperature of the reaction mixture is gradually raised to 175° C. for ½ hour and finally at 190 C. for 1 hour. During the first 1½ hours of reaction, carbon dioxide is bubbled through the reaction mixture and during the last hour, the reaction is carried out under an absolute pressure corresponding to about 8-10 millimeters of mercury. The polyester is found to have an acid number of 50.

Various glycols having 2-8 carbon atoms may be used in preparing the polyesters, as for example, ethylene glycol, diethylene glycol, triethylene glycol, tetraethylene glycol, propylene glycol, e. g., 1,2 and 1,3-propanediol, trimethylene glycol, butylene glycols, e. g., 1,3- and 1,4-butanediol, and the like. In some cases, it may be desirable to use a slight excess of glycol over the amount required for esterification of the dicarboxylic acid, for example, in preparing polyester "A," a 10% excess is employed. However, this is not necessary to achieve transparent castings in accordance with the invention as illustrated by the use of polyester "B" which is made by reacting equivalent amounts of carboxylic acids and glycols.

In place of maleic anhydride, maleic acid may be used as well as other alpha,beta-unsaturated dicarboxylic aliphatic acids or the anhydrides thereof having not over 8 carbon atoms. Examples of other acids of this type are fumaric acid, citraconic acid, itaconic acid, mesaconic acid, methyl ethyl maleic acid, diethyl maleic acid, chlormethyl maleic acid and the like. A preferred group of acids or anhydrides comprises the compounds having the general formula:

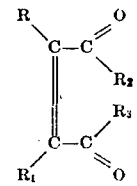

wherein R and $R_1$ are hydrogen, halogen, e. g., chlorine, bromine, etc., or alkyl groups having not over two carbon atoms and $R_2$ and $R_3$ are OH or $R_2$ and $R_3$ together stand for oxygen. When desired, mixtures of two, three or more of these acids may be used.

For some purposes, it may be desirable to replace a minor proportion of the unsaturated acid with a saturated dicarboxylic acid having 4–8 carbon atoms such as phthalic anhydride, succinic acid and adipic acid.

It is obvious that many variations may be made in the products and processes of this invention without departing from the spirit and scope thereof as defined in the appended claim.

What is claimed is:

In the process for preparing casting free from internal haze by the mass polymerization of a mixture containing from 2–60 parts of styrene and 100 parts of a substantially water-free unsaturated polyester in the presence of an organic peroxide polymerization catalyst, said polyester being a condensation product of a glycol containing from 2–8 carbon atoms and maleic acid, the step which comprises improving the clarity of the heat-hardened casting by incorporating in the mixture 0.01–1.0% based on the total weight of the mixture, of the sodium sulfonate of dodecyl benzene prior to polymerization beyond the fluid stage.

GEORGE L. FRASER.
HAROLD F. PARK.

REFERENCES CITED

The following references are of record in the file of this patent:

UNITED STATES PATENTS

| Number | Name | Date |
|---|---|---|
| 2,275,716 | Bachman | Mar. 10, 1942 |
| 2,408,690 | Seymour | Oct. 1, 1946 |
| 2,443,735 | Kropa | June 22, 1948 |
| 2,467,526 | Harris | Apr. 19, 1949 |
| 2,473,708 | Hayes | June 21, 1949 |
| 2,473,801 | Kropa | June 21, 1949 |
| 2,516,309 | Fraser | July 25, 1950 |

OTHER REFERENCES

Rust: Ind. & Eng. Chem., pp. 64, 66 and 67, January 1940.